United States Patent [19]

Hellmann et al.

[11] Patent Number: 5,460,438
[45] Date of Patent: Oct. 24, 1995

[54] DAMPING DEVICE, PARTICULARLY FOR HYDRAULIC BRAKE SYSTEM

[75] Inventors: Harald Hellmann, Moeglingen; Wolfgang Maisch, Schwieberdingen; Robert Mergenthaler, Markgroeningen, all of Germany

[73] Assignee: Robert Bosch GmbH, Stuttgart, Germany

[21] Appl. No.: 223,783

[22] Filed: Apr. 6, 1994

[30] Foreign Application Priority Data

Apr. 6, 1993 [DE] Germany ............. 43 11 263.3

[51] Int. Cl.$^6$ ............................................. B60T 8/36
[52] U.S. Cl. ................... 303/119.2; 303/87; 138/30
[58] Field of Search ..................... 303/87, 116.4, 303/119.2; 138/28, 30, 31; 192/109 F, 109 D

[56] References Cited

U.S. PATENT DOCUMENTS

| | | | |
|---|---|---|---|
| 651,617 | 6/1900 | Tilden | 138/28 |
| 3,061,039 | 10/1962 | Peters | 181/47.1 |
| 3,422,853 | 1/1969 | Schmid | 138/30 |
| 3,940,637 | 2/1976 | Ohigashi et al. | 310/85 |
| 4,366,011 | 12/1982 | Nolf | 156/86 |
| 4,563,725 | 1/1986 | Kirby | 361/388 |
| 4,789,164 | 12/1988 | Winter et al. | 277/9 |
| 4,911,204 | 3/1990 | Martin | 138/30 |
| 5,070,983 | 12/1991 | Leigh-Monstevens et al. | 303/87 X |
| 5,161,864 | 11/1992 | Cardenas et al. | 303/87 |
| 5,209,553 | 5/1993 | Burgdorf et al. | 303/87 |
| 5,244,262 | 9/1993 | Kehl et al. | 303/119.2 |
| 5,294,885 | 3/1994 | Gentsch et al. | 324/316 |

FOREIGN PATENT DOCUMENTS

| | | | |
|---|---|---|---|
| 2117685 | 12/1972 | Germany . | |
| 2208491 | 8/1973 | Germany . | |
| 964260 | 10/1982 | U.S.S.R. | 303/87 |
| 1590003 | 5/1981 | United Kingdom . | |

Primary Examiner—Robert J. Oberleitner
Assistant Examiner—Lee W. Young
Attorney, Agent, or Firm—Edwin E. Greigg; Ronald E. Greigg

[57] ABSTRACT

A damping device for pressure pulsations having a first hollow chamber for receiving hydraulic pressure fluid and a second hollow chamber. An elastic metal diaphragm that divides the second hollow chamber hermetically from the first hollow chamber. The second hollow chamber is evacuated, so that in the event that the metal diaphragm should possibly leak, no air can get into the hydraulic pressure fluid. The damping device can be used in hydraulic brake systems having a master cylinder and in other hydraulic systems.

11 Claims, 2 Drawing Sheets

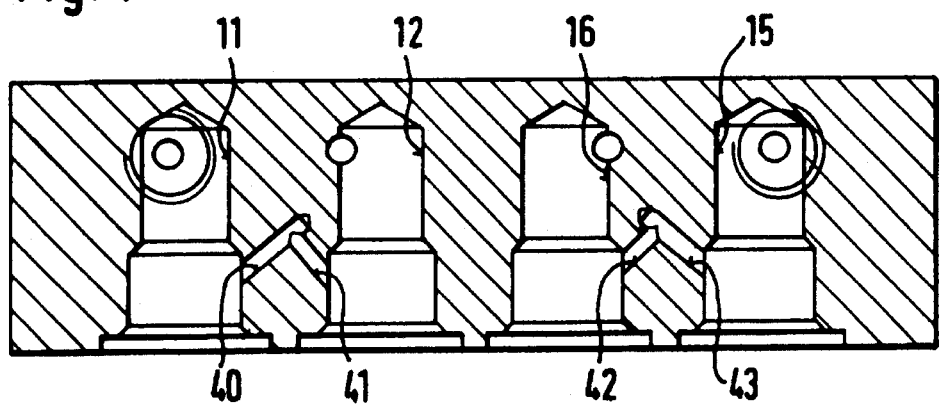
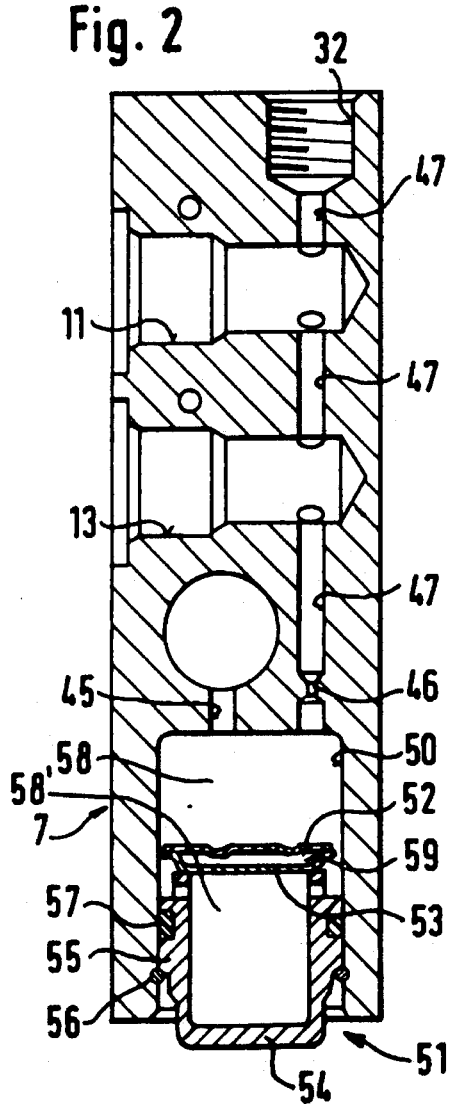
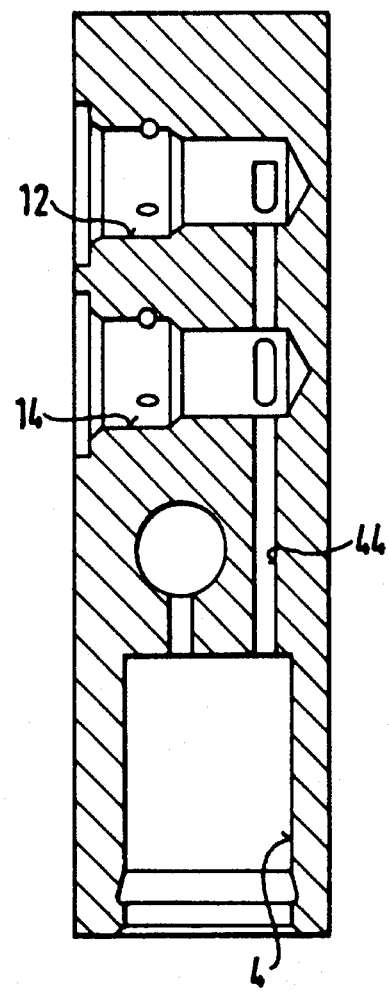

5,460,438

DAMPING DEVICE, PARTICULARLY FOR HYDRAULIC BRAKE SYSTEM

BACKGROUND OF THE INVENTION

The invention is based on a damping device as defined hereinafter.

Damping devices in conjunction with hydraulic brake systems are known from British Patent 15 90 003 and have one hollow chamber closed by a cap and one inlet conduit and one outlet conduit each inside a housing, with a throttle associated with the respective outlet conduit. For damping, the volumetric elasticity of a hydraulic pressure fluid, in this case the so-called brake fluid, located in the applicable hollow chamber is utilized. European Patent 0 479 962 A1 discloses a damping device of the same kind, whose cap is provided with a tubular connection piece that is inserted into a cylindrical bore located in the housing and is sealed off relative to this bore and axially fixed. Since only the volumetric elasticity of the pressure fluid is utilized, a possibly problematic space requirement for such damping devices cannot be precluded.

From International Patent Disclosure WO 90/12713, a further damping device for a hydraulic brake system is known. This damping device has a hollow chamber, likewise closed with a cap, but only one conduit discharges into the hollow chamber and therefore serves in alternation as an inlet conduit and at outlet conduit. An elastomeric energy storing element is located in the hollow chamber. it is an elastomeric body, for instance of elliptical shape, whose structural core has high elasticity and whose envelope surrounding the structural core is of a material of high density and rigidity with an elastic deformation property. According to one proposal, the variable volumetric takeup of the elastomeric energy storing element is intended to be a maximum of 2 mm$^2$ per bar of pressure. A disadvantage is that with intensive elastic deformation the elastomeric energy storing element may possibly be strongly heated, which changes its elasticity. Nor can it be precluded that from such heating the materials of the elastomeric energy storing element will rapidly age and become brittle, resulting in sacrifices of damping capacity.

German Offenlegungsschrift 22 08 491 discloses a further damping device for pulsation damping, which has a pressure container with at least one pressure container wall defined by a first buckling edge. This pressure container wall is exposed to the pressure pulsations in the hydraulic pressure fluid, on the one hand, and on the other to the ambient atmosphere and is embodied with flexional elasticity in the manner of a metal diaphragm. The flexional elasticity determines the volumetric takeup per unit of pressure change. If a pressure container wall should lose its tightness as a result of a progressive pulsating string, then pressure fluid is lost and the associated hydraulic system fails.

A further damping device, known from German Offenlegungsschrift 21 27 685, has a first hollow chamber, which is filled with the hydraulic pressure fluid of the associated hydraulic system, a second hollow chamber with an air column, and an elastic metal diaphragm dividing the two hollow chambers from one another. Fatigue on the part of such a metal diaphragm, causing it to leak, cannot be precluded. This has the disadvantage that as a consequence of pressure fluctuations that are to be damped, liquid pressure fluid gets into the second hollow chamber and that then, when pressure drops occur, air from the second hollow chamber gets into the first hollow chamber and finally into the hydraulic system. Especially when the hydraulic system is a vehicle brake system that is to be operated with a master cylinder, pressure fluid that has gotten into the brake system can cause reduced braking performance and thus can lead to an accident.

OBJECT AND SUMMARY OF THE INVENTION

The damping device according to the invention has the advantage that if the metal diaphragm loses its tightness, air or cushioning gas cannot get into the hydraulic pressure fluid.

Further advantageous developments of the damping device disclosed are possible by providing a space-spacing design, particularly with a view to the diameter requirement for the damping device. Further, it is possible to accommodate the metal diaphragm that enclose the second hollow chamber in previously known hollow chambers, for instance. For the sake of simplified mechanical assembly, the metal diaphragms and the cap can be installed in a single operation.

In carrying out the invention, only slight modifications of the cap are necessary in order to arrive at the advantages resulting from the invention as set forth herein.

The invention sets forth a preferred material for the metal diaphragm including suggested dimensions for designing the at least one metal diaphragm for use in a vehicle brake system that is typically suitable for passenger cars.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 2 is a section taken along the line II—II of FIG. 1;

FIG. 3 is a section taken along the line III—III of FIG. 1; and

FIG. 4 is a section taken along the line IV—IV of FIG. 1.

DESCRIPTION OF THE PREFERRED EMBODIMENT

Figure 1:
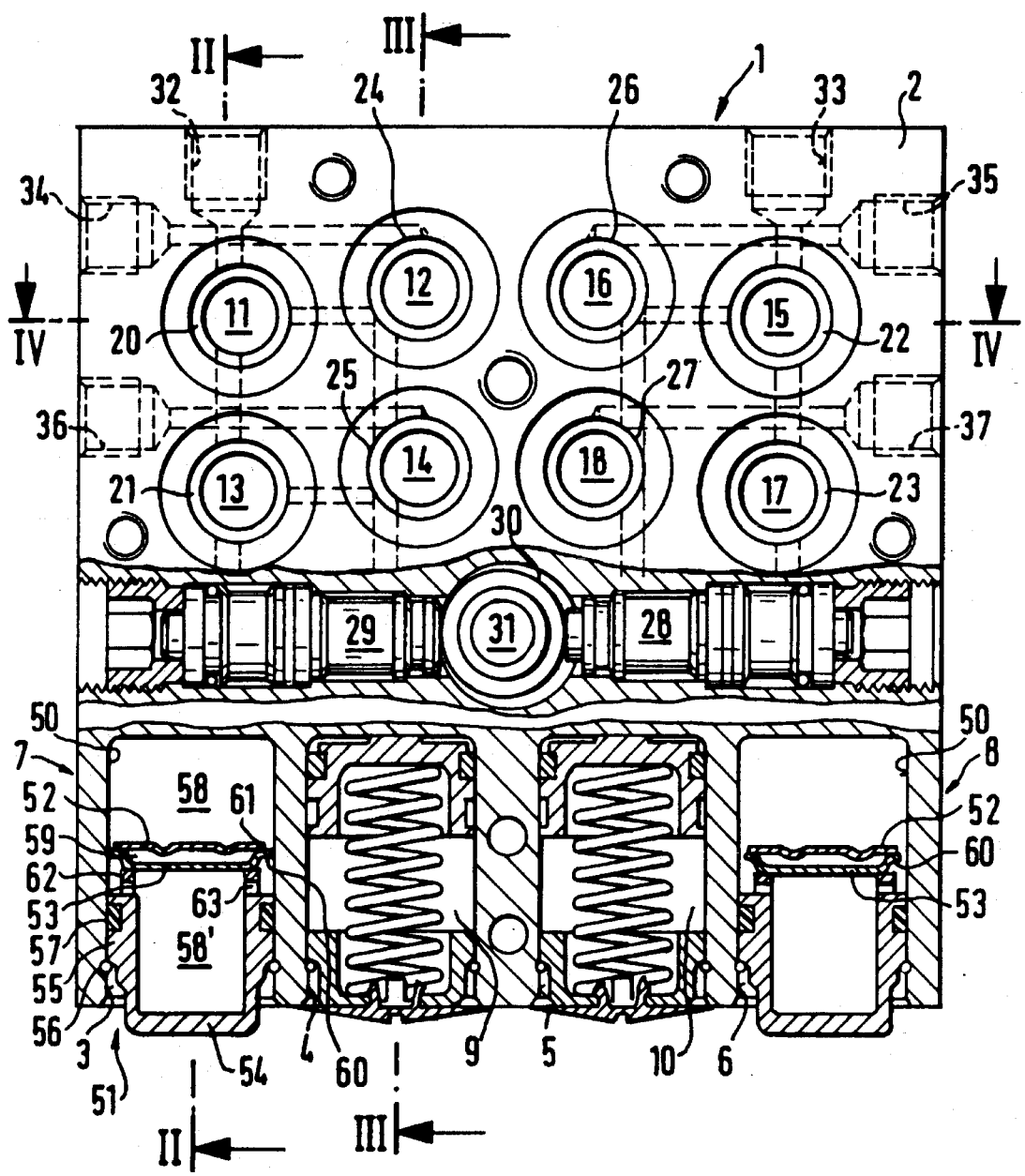
FIG. 1 is a side view of a housing, partially in section.

A housing 1, provided with four outlets for the connection of four wheel brake cylinders, not shown, and receiving four control conduits, has a base plate 2, in which four receiving bores 3, 4, 5, 6 are provided, from the lower narrow side as seen in the drawing, for two dampers 7 and 8 and two reservoirs 9 and 10, respectively. As seen in the drawing, bores 3 and 6 have the dampers and bores 4 and 5 have the reservoirs. On the other hand, on its broad side at right angles to this, the base plate 2 has eight receiving bores 11, 12, 13, 14, 15, 16, 17, 18 for eight magnet valves of the four control conduits, that is, four inlet magnet valves 20, 21, 22, 23 and four outlet magnet valves 24, 25, 26, 27. Approximately halfway up the broad side of the base plate 2, two return pumps 28 and 29, facing one another coaxially, are provided parallel to the broad side, and a drive cam 30 and a motor 31 are provided between the pumps.

On its other three narrow sides, the base plate 2 also has six connection bores 32, 33, 34, 35, 36, 37, two of them (32, 33) for two master cylinders (in a tandem or parallel arrangement), not shown, and two of them (34, 35) for the two wheel brake cylinders of the front wheels, and two of them (36, 37) for the wheel brake cylinders of the rear wheels.

As FIG. 1 and the sectional views of FIGS. 2 and 3 show, in this design the reservoirs and dampers are disposed at the bottom in the installed position of the housing 2, and of the magnet valves 20–27 located above them, the outlet magnet valves 24, 25, 26, 27 are higher than the inlet magnet valves 20, 21, 22, 23 respectively associated with them. This has the advantage that when the hydraulic system is bled, the air can flow out to the wheel brake cylinders through the outlet magnet valves 24, 25, 26, 27. On the other hand, a drop is created toward the respective reservoir 9 or 10 through a conduit 44, through which the fluid can automatically return. There is also a flow through a conduit 45 of the dampers 7 or 8 from the return pump, and the fluid reaches the master cylinder connection 32 (see FIG. 2) through a throttle 46 and a conduit 47.

FIG. 1 shows by dashed lines that the receiving bores 11/12; 13/14; 15/16; 17/18 for each pair interconnect and as shown in FIG. 4 receiving bores 11/12 and 15/16 of the inlet and outlet magnet valves communicate with one another through two oblique conduits 40/41 and 42/43. These oblique conduits 40/41 and 42/43 have no openings leading to the outside. Hence plugs and ball seals are unnecessary here.

Elements of the damper 7 inside the housing 2 are a bore 50, a cap 51 that closes the bore 50 from the outside, a first wall 52, and a second wall 53. The first wall 52, second wall 53 and the cap 51 form a first chamber 58 within the bore 50. The cap 51 has an end wall 54, onto which a tubular connection piece 55 is formed. The tubular connection piece 55 extends into the bore 50 and is secured in an axial direction by means of securing ring 56. A sealing ring 57 prevents the loss of hydraulic pressure fluid from the damper 7.

The first wall 52 and preferably the second wall 53 as well are embodied as metal diaphragms and between them enclose a second hollow chamber 59. For that purpose the second wall 53, for instance, is embodied in platelike fashion with an edge 60 and is tightly joined to an edge 61 of the first wall 52. This joining can be done by soldering or welding, for instance, or in some other way known for producing barometer cells and manometers. For instance, the first wall 52, which forms the first metallic diaphragm, can be embodied in corrugated fashion, in the manner known from so-called diaphragm pressure gauges. The second wall 53, the end wall 54 and the tubular connection piece 55 form a third chamber 58'.

According to the invention, the second hollow chamber 59 is evacuated. This is attainable if the first metal diaphragm 52 is soldered or welded to the second metal diaphragm 53 in a vacuum. However, the evacuation can also be done after the second metal diaphragm 53 has been tightly joined to the first metal diaphragm 52, through an opening to be closed subsequently. The concept of the invention of providing a vacuum on one side of such metal diaphragms 52, 53 is not limited to the direct joining together, shown in the drawings, of the metal diaphragms 52 and 53 along their edges 60 and 61.

The diameters of the two metal diaphragms 52 and 53 are selected such that when they are introduced into the bore 50 an annular gap from the bore 50 remains. In order to facilitate the introduction of the metal diaphragms 52 and 53, the second metal diaphragm 53 is joined to the tubular connection piece 55 of the cap 51. To that end, adjacent to the metal diaphragm 53, the tubular connection piece 55 has a securing edge 62, to which the second metal diaphragm 53 is soldered or welded on the face end. At least one opening 63 pierces the tubular connection piece 55 between the second metal diaphragm 53 and the sealing ring 57, so that a pressure that can be introduced into the bore 50 can enter chamber 58' within the cap 51 and act upon not only the first metal diaphragm 52 but also the second metal diaphragm 53. For supplying a hydraulic pressure fluid and building up the aforementioned pressure, the conduit 45 visible in FIG. 2 is used. The hydraulic pressure fluid can be drawn from the bore 50 through the throttle 46 and the conduit 47 and taken to any receivers, such as a master cylinder. When it is wheel brake cylinders that are being supplied, then the hydraulic pressure fluid is the so-called brake fluid.

The first metal diaphragm 52 and the second metal diaphragm 53 can be made from a hardenable copper-beryllium alloy, for instance. At predetermined diameters of the metal diaphragms 52 and 53, their thicknesses will be selected such that in use in a hydraulic brake system of a passenger car, a pressure increase of 100 bar in the bore 50 produces an incoming flow of approximately 0.05 cm to 0.06 cm$^3$ of the hydraulic pressure fluid. If the damping device is employed in a different brake system or in some other hydraulic system, then something other than the volumetric elasticity cited can bring about an advantageous damping action.

Since the second hollow chamber 59 is relatively small, only a comparatively small quantity of hydraulic pressure fluid can enter the second hollow chamber 59 in the event that one of the two metal diaphragms 52 or 53 should be damaged and leak. Also, since because of the evacuation according to the invention neither air nor gas is located in the second hollow chamber 59, then in the event of pressure pulsations in the first hollow chamber 58 neither air nor gas can get into the hydraulic pressure fluid located in it. The hydraulic pressure fluid thus remains free of undesirable or even dangerous elasticity. This is particularly highly advantageous if the hydraulic system is a hydraulic brake system with a master cylinder, whose feed capacity is known to be limited by the longest possible piston stroke.

The damper 8 has the same structure as the damper 7. It should additionally be noted that the concept of the invention of evacuating the second hollow chamber can also be adopted for the damping device of FIG. 1 of German Offenlegungsschrift 21 27 685, or for any other structural design.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A damping device having a housing, a first hollow chamber in the housing for receiving hydraulic pressure fluid of a hydraulic brake system, a second hollow chamber partially surrounded by said first hollow chamber, a first elastic metal diaphragm that separates the second hollow chamber from the first hollow chamber, and the second hollow chamber (59) is formed as a vacuum chamber.

2. A damping device as defined by claim 1, in which a second metal diaphragm (53) is spaced apart from said first elastic metal diaphragm (52), and that said first and second metal diaphragms (52, 53) enclose the second hollow chamber (59) between them.

3. A damping device as defined by claim 2, in which said first and second metal diaphragms (52, 53) are accommodated inside the first hollow chamber (50, 58), and that the first hollow chamber (50, 58) is closed by a cap (51).

4. A damping device as defined by claim 3, in which said second metal diaphragm (53) is combined with the cap (51).

5. A damping device as defined by claim 4, in which the cap (51) includes a tubular connection piece (55) that extends into a bore (50) located in the housing (2) in a sealed fashion, and that the second metal diaphragm (53) is secured to the tubular connection piece (55), and that beginning at the bore (50), at least one opening (63) discharges into the tubular connection piece (55).

6. A damping device as defined by claim 1, in which said first diaphragm (52) is produced from a copper-beryllium alloy.

7. A damping device as defined by claim 2, in which at least one of said first and second metal diaphragms (52, 53) is produced from a copper-beryllium alloy.

8. A damping device as defined by claim 3, in which at least one of said first and second metal diaphragms (52, 53) is produced from a copper-beryllium alloy.

9. A damping device as defined by claim 4, in which at least one of said first and second metal diaphragms (52, 53) is produced from a copper-beryllium alloy.

10. A damping device as defined by claim 3, in which at least one of said first and second metal diaphragms (52, 53) is designed such that at a pressure rise of 100 bar in the first hollow chamber (58), said first hollow chamber (58) receives an additional volume of substantially 0.06 cm$^3$ of hydraulic pressure fluid.

11. A damping device as defined by claim 2, in which at least one of said first and second metal diaphragms (52, 53) is designed such that at a pressure rise of 100 bar in the first hollow chamber (58), said first hollow chamber (58) receives an additional volume of substantially 0.06 cm$^3$ of hydraulic pressure fluid.

* * * * *